March 13, 1956     L. C. NEWMAN     2,737,965
THERMALLY CONTROLLED GAS MIXER
Filed Oct. 20, 1952
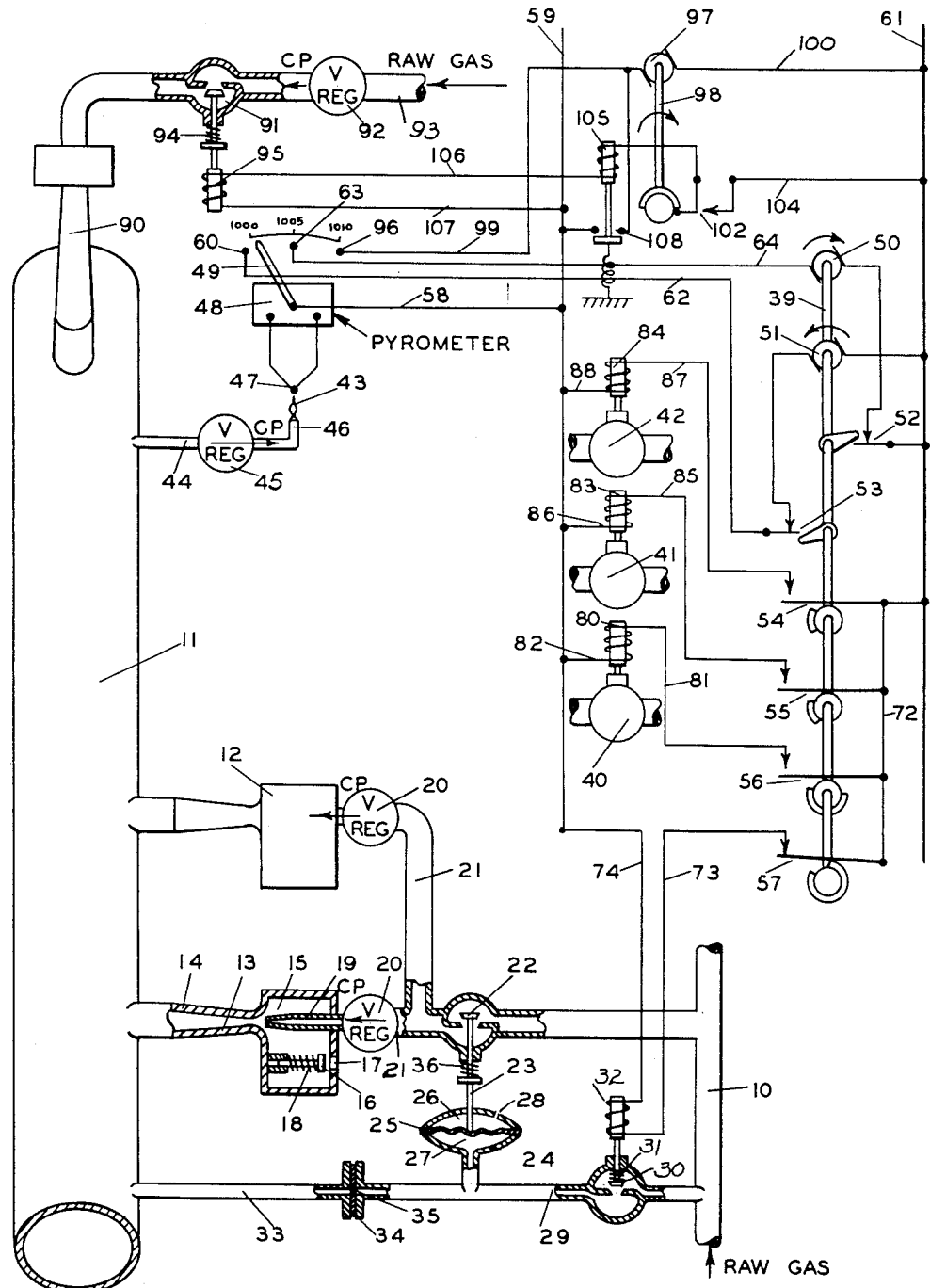
INVENTOR.
LEONARD C. NEWMAN
BY
Buckhorn and Cheatham
ATTORNEYS United States Patent Office 2,737,965
Patented Mar. 13, 1956

2,737,965

THERMALLY CONTROLLED GAS MIXER

Leonard Calvin Newman, Portland, Oreg.

Application October 20, 1952, Serial No. 315,802

10 Claims. (Cl. 137—90)

The present invention relates to gas handling apparatus and more particularly to apparatus for mixing a combustible gas with a diluent to obtain a mixture of predetermined heat value per unit volume.

Normally, hydrocarbon fuel gases as delivered to the distributor are of a heat value per unit volume greatly exceeding that for which the burners of the gas system are adjusted. It is necessary, therefore, that the fuel gases be mixed by suitable apparatus with a diluent, generally air, so as to obtain a gas-air mixture of the desired heat value. The control systems utilized heretofore in controlling gas mixing apparatus have generally relied upon indications from factors other than the actual heat value of the mixed gases. Under certain conditions control through such factors is satisfactory, but in other instances the indication derived from the selected factor is not truly representative of the actual heat value of the gas mixture being produced and, as a result, the desired control of the gas mixing apparatus is not obtained. Variations in atmospheric conditions or in the heat content of the raw fuel gas have also affected such systems, requiring manual adjustment of various components thereof so as to maintain the desired heat value of the gas mixture being produced.

It is a specific object of the present invention, therefore, to provide a control arrangement for a gas mixing apparatus that is directly responsive to the heat value of the mixed gases being produced.

A more general object of the present invention is to provide a new and improved apparatus for controlling the mixing of a combustible gas with a diluent to obtain a mixture of predetermined heat value.

Another object of the invention is to provide means for continuously producing a mixture of fuel gas and air of predetermined heat value irrespective of changes in the heat value of the fuel gas being mixed.

A further object of the invention is to provide gas mixing apparatus for continuously mixing atmospheric air with a fuel gas to obtain a mixture of predetermined heat value content, which apparatus is not affected by changes in atmospheric conditions.

Other objects and advantages of the present invention will become more apparent hereinafter.

In accordance with an illustrated embodiment of the invention, a plurality of aspirator-type gas mixing tubes are provided to discharge a mixture of gas and air into a gas main comprising a portion of a gas system. A calorimetric device is provided to determine continuously, and to indicate, the heat value of the gas mixture within the main. Control means responsive to the changes in the indications of the calorimetric device are provided to control the operation of the aspirators whereby the heat value of the gas mixture within the main is maintained at all times within predetermined minimum and maximum limits.

For a more complete description of the invention, reference is made to the following specification taken in connection with the accompanying drawing, which is a schematic diagram illustrating the control arrangement of the present invention.

Referring now to the drawing, the numeral 10 indicates a pipe line connected with a source of gaseous fuel under pressure, and 11 indicates a service main or reservoir into which a dilute mixture of the gaseous fuel is introduced through a plurality of conventional aspirator-type gas mixing devices. For the sake of clarity, only two aspirators 12 and 13 are shown connected between the pipe line 10 and the main 11, the aspirator 13 being shown in cross-section. The aspirators 12 and 13 are mounted with the discharge end of the Venturi section 14 thereof opening into the main 11, the housing of the aspirators being enlarged at the throat end of the Venturi to form a vacuum chamber 15 in which is mounted a valve 16 adapted to close an air inlet 17 provided in the chamber wall. A spring 18 is provided to bias the valve 16 to close the opening, which spring preferably is of relatively slight biasing force. Extending through the rear wall of the aspirator housing, and aligned with the throat of the Venturi tube, is a nozzle 19. As is well known, the ejection of gas at high velocity through the nozzle 19 and through the restricted throat of the Venturi section 14 will create a partial vacuum within the chamber 15 whereby the pressure of the atmosphere will force valve 16 to open and permit air to enter the chamber 15 from which it will be drawn into the Venturi section and be mixed with the gases from the nozzle 19. To more clearly understand the description of the control arrangement of the invention, it should be realized that, for a given velocity of gases through the aspirator, the richness of the gas discharge from an aspirator into the main will be relatively proportional to the internal pressure within the main. That is, as the pressure within the main increases, the proportion of air drawn in with the rich fuel gases will decrease since the differential pressure between the main and the atmosphere upon which the rate of air flow through port 17 is dependent will also decrease.

The pressure in the gas source and the pipe line 10 will generally be much higher than it is desired to feed to the aspirator nozzles and, on occasions, will be subject to fluctuations. Thus, to reduce the pressure and to maintain the gas flow through the aspirator nozzles at a steady rate, a constant pressure outlet valve 20 is preferably provided in each of the feed lines 21, which connect the nozzles 19 of the aspirators 12 and 13, respectively, to the pipe line 10.

Suitable valve means are provided for controlling the flow of gas to the aspirators. Though it is to be understood that the aspirators may be controlled individually, it is preferred that they be arranged in batteries, as in the present instance, wherein the gas flow to the aspirators 12 and 13 is controlled by a normally closed control valve 22 mounted in the pipe line 10. The stem 23 of the control valve 22 is connected to the diaphragm 24 of a pressure responsive device 25 including a housing defining a low pressure chamber 26 on one side of the diaphragm and a high pressure chamber 27 on the other side thereof. The low pressure chamber 26 is open to atmosphere through a port 28 and the high pressure chamber 27 is connected to the pipe line 10 on the upstream side of the control valve 22 by a conduit 29. A pilot valve 30 is provided in conduit 29, a spring 31 being provided to urge the pilot valve to a normally closed position. The pilot valve 30 is adapted to be opened by a relay 32, the energization of which relay is controlled by a circuit to be described hereinafter. The high pressure chamber 27 is also connected to the main 11 by a conduit 33, a disc 34 having a restricted orifice 35 therethrough being mounted in the conduit 33. Upon opening of the pilot valve 30 the gas will flow through the conduits 29 and 33. The restricted orifice 35, however, will cause the gas to be diverted toward the pressure device 25 whereby the pressure within the chamber 27 will be increased to deflect the diaphragm 24 and open the control valve 22. Upon closure of the pilot valve 30, the gas will escape to the main 11 through the orifice 35 and the control valve 22 will be urged to a closed position by the spring 36 arranged about the control valve stem 23. The use of the pilot valve controlled diaphragm operated control valves is generally necessary since the pressure and rate of gas flow is generally too large to be handled directly by a solenoid operated valve. It will be apparent, however, that other types of valve arrangements can be used in the present system without departing from the spirit of the invention.

Additional aspirators may be connected to the main 11 in a similar manner, the pilot valves for controlling such aspirators being indicated in the drawing at 40, 41 and 42 for the purpose of illustrating the operation of the control arrangement of the invention.

In accordance with the present invention, means are provided for controlling the flow of gas to the main in response to indications of predetermined minimum and maximum heat values of the gas mixture in the main. More specifically, the pilot valves 30, 40, 41 and 42, and consequently the operation of the aspirators to feed gas into the main, are controlled in response to the demands of the main to maintain a gas mixture therein having a given fuel value. For purposes of illustration it will be assumed that it is desired that the gas mixture within the main 11 have a minimum heat value of 1,000 B. t. u. per cubic foot and a maximum heat value of 1,005 B. t. u. per cubic foot. It should be understood that these figures are purely representative and that the control arrangement herein described is adapted to the control of systems within any range of heat value. To derive indications of changes in the heat value of the gas mixture within the main 11, a calorimetric device is operatively connected to the main. As shown, a tap line 44 is provided to conduct gas from main 11 to a suitable burner 46, a constant pressure outlet valve 45 being provided in the line 44 to regulate the flow of the gas through the tap line to a predetermined constant rate. Arranged above the burner 46 and in the flame 43 thereof, is the hot junction 47 of a conventional thermal electric pyrometer 48 having an indicator element 49 movable in response to changes in the temperature of the burner flame and adapted to indicate at any given time the temperature of the flame. Since the flame temperature is proportional to the heat value of the gas mixture being burned, the indicator scale may be calibrated in terms of the heat value of the gas, as illustrated.

Means responsive to the movements of the indicator element 49 are provided successively to start or stop the operation of the feed aspirators at predetermined intervals of time in response to continued indications of minimum or maximum heat values of the gas mixture in main 11. Operatively connected to the indicator element 49 and responsive to movements thereof is a time switch device indicated generally at 39 and driven by a reversible motor illustrated for convenience as consisting of two separate motor sections, a clockwise rotating motor 50 and a counterclockwise rotating motor 51. Operatively connected to the time switch 39 and responsive to movements thereof are a plurality of valve control means adapted to open successively certain of the aspirator pilot valves at predetermined intervals upon indication of a predetermined minimum flame temperature and to close certain of the pilot valves upon indication of a predetermined maximum flame temperature. The motor 50, 51 is operatively connected for driving a plurality of switch devices indicated generally at 52, 53, 54, 55, 56 and 57, switches 52 and 53 being limit switches for the motor 50, 51, the remaining switches being connected as will be described to operate the pilot valves 42, 41, 40 and 30, respectively. For the sake of clarity these devices are shown as cam operated, though it will be obvious that other types of switch devices may be used. The speed of motor 50, 51 is such that the motor rotates at a constant speed to effect successive operation of the switch devices 54, 55 and 56 and 57 at predetermined intervals of time, for example, one minute, the reason for which will become apparent hereinafter.

The connection of the motors 50, 51 to the pyrometer will now be described. The pyrometer indicator element 49 is connected by a conductor 58 to the power supply line 59. Provided on the pyrometer scale at a point corresponding to an indication of a heat value of 1,000 B. t. u. per cubic foot is a contact 60 which is connected to the opposite power supply line 61 through a circuit including a conductor 62, the normally closed limit switch 53 and the counterclockwise rotating motor 51. A maximum heat value contact 63 is provided on the pyrometer at a point corresponding to an indication of 1,005 B. t. u. per cubic foot, which contact is connected to the power supply line 61 through a circuit including a conductor 64, the clockwise rotating motor 50, and the normally closed limit switch 52. The limit switch 52 is adapted to open and thereby stop the clockwise rotation of the motor 50 when all the cam switches 54, 55, 56 and 57 are open; and, conversely, the cam switch 53 is adapted to open and to stop the counterclockwise rotation of the motor 51 when all of the cam switches 54, 55, 56 and 57 are closed. The drawing illustrates an assumed condition wherein the discharge of the aspirators 12 and 13 controlled by the pilot valve 30 is sufficient to maintain the desired B. t. u. value of the gas in the main. Under such a condition previous operations of the control arrangement of the invention resulted in closing switch 57 to close a circuit through the winding of the relay 32 to effect energization of the relay and open the valve 30. This circuit can be traced from the power supply line 61, through the conductor 72, the closed cam switch 57, conductor 73, the winding of the relay 32, and conductor 74.

Assuming now that the heat value of the gas mixture in the main decreases, the pyrometer indicator element 49 will move in a counterclockwise direction toward the minimum contact 60. Upon engagement of the element 49 with the minimum contact 60, the circuit through the counterclockwise motor 51 will be closed, energizing the motor 51 and causing counterclockwise rotational movement of the cams driven thereby closing first the switch 56. Closing of the cam switch 56 closes a circuit through the winding of a relay 80 which opens the pilot valve 40. This circuit can be traced from supply line 61, through the conductor 72, the closed switch 56, conductor 81, the winding of the relay 80, and conductor 82, to the supply line 59. If the additional gas supplied by the aspirators controlled by the pilot valve 40 is sufficient to cause an increase in pressure in main 11, the richness of the gas mixture discharged by the aspirators will also increase and will be reflected by an increase in the temperature of the flame 43. Assuming that the increase in heat value occurs within one minute and is sufficient to cause the pyrometer element 49 to disengage from the contact 60, the circuit through the motor 51 will be opened causing the motor to stop. If on the other hand the input of the aspirators controlled by the pilot valve 40 is not sufficient to cause an increase in the heat value of the gas in main 11, or if the heat value decreases again after increasing, the motor 51 will operate to close the switch 55 closing a circuit through the winding of the relay 83 which opens the valve 41 and effects operation of the aspirators controlled thereby. The circuit through the relay 83 can be traced from the power supply line 61, through the conductor 72, the closed switch 55, the conductor 85, the winding of the relay 83, and conductor 86, to the power supply line 59. The motor will then stop or continue to rotate depending upon whether the additional discharge into the main is sufficient or insufficient, respectively, to raise the heat value of the gas in main 11. If the heat value of the gas in main 11 continues to remain below 1000 B. t. u. per cubic foot, the motor 51 will remain in operation to close the switch 54 which completes a circuit through the winding of the relay 84 to energize the same and open the valve 42. Immediately after switch 54 closes, the cam of the limit switch 53 will open switch 53 to open the circuit through motor 51, causing the motor to stop. The circuit through the relay 84 can be traced from the power supply line 61, through the conductor 72, the closed switch 54, the conductor 87, the winding of the relay 84, the conductor 88, to the power supply line 59. It will be seen from the foregoing that the delay between the successive operation of the switches 57, 56, 55 and 54 affords an opportunity for the effect of the addition of a battery of aspirators to be indicated by the pyrometer 48. The period of delay is entirely dependent upon the characteristics of a particular system and may be readily determined in any instance. It should be understood that any number of aspirators may be controlled in like manner and a commercial installation should be supplied with sufficient aspirators to meet the greatest possible demands of the gas system.

The operation of the control system in the event that the heat value of the gas mixture in the main 11 reaches the desired maximum value of 1,005 B. t. u. per cubic foot is substantially the reverse of the foregoing operation. Assume, for example, that all the aspirators are discharging into main 11, in which event the time switch 39 will be in its extreme counterclockwise position with the switches 54, 55, 56 and 57 closed and the switch 53 open. If, then, the heat value of the gas mixture in the main 11 should rise to the assumed predetermined desired maximum value of 1,005 B. t. u. per cubic foot, the pyrometer indicator element 49 will move into engagement with the maximum contact 63, energizing the clockwise rotating motor 50. As motor 50 begins to rotate, the limit switch 53 will close and the switch 54 will open to effect closing of the pilot valve 42, which, of course, will terminate the discharge of the aspirators controlled thereby. If in the interval between the time that switch 54 opens and the time that the time switch 39 rotates to permit switch 54 to close, the heat value of the gas mixture in the main 11 decreases below 1,005 B. t. u., the indicator element 49 will disengage from contact 63 and the motor 50 will stop. If the heat value of the gas mixture should again rise or, on the other hand, if after the switch 54 is opened the heat value should remain above 1,005 B. t. u. per cubic foot, the motor 50 will be energized to rotate and cause switch 55 to open. The motor 50 will then stop or continue to rotate in like manner, depending upon the effect of the termination of the discharge of the aspirators until the heat value of the gas in main 11 drops below, 1,005 B. t. u. per cubic foot. If the heat value should at any time drop below 1,000 B. t. u. per cubic foot, the operation will reverse, of course, to place additional aspirators into operation. It will be observed from the preceding description that the control system is self-balancing and that the aspirators will be put into operation or taken off as is necessary to maintain the heat value of the gas mixture in main 11 within the desired minimum and maximum limits.

If, with only the arrangement described above, the gas main 11 should become plugged, or the consumption therefrom cease entirely, it will be apparent that the pressure in the main, and consequently the heat value of the gas therein, will increase until the heat value reaches the desired maximum of 1,005 B. t. u. per cubic foot and the aspirators of the batteries controlled by the pilot valves 39, 40, 41 and 42 will be cut off from operation. If, then, consumption is resumed to withdraw gas from the main, it will be observed that the heat value of the gas in the main would remain constant through the pressure decreased, since nothing will enter the main to cause dilution of the gas mixture therein. Thus, the burner flame 43 would remain at its maximum temperature and the pyrometer indicator element 49 would remain in engagement with the maximum contact point 63 until the gas was exhausted from the main and the burner extinguished. Obviously, such a condition is not desirable.

To prevent such action, there is provided a constantly operating pilot aspirator indicated at 90 which is similar in construction to the aspirators 12 and 13 and which is preferably connected to the main 11 closely adjacent the tap line 44 whereby its discharge will quickly flow to the burner 46, the purpose of which arrangement will become more apparent hereinafter. The nozzle of the pilot aspirator 90 is connected through a normally open control valve 91 and a constant pressure regulating valve 92 to a pipe line 93 which is connected to the same source of fuel gas as the pipe line 10. The pilot aspirator 90 is preferably one of relatively low volumetric capacity so that a solenoid-operated control valve may be used directly in the line leading to the nozzle of the aspirator. As indicated, the control valve 91 is biased to an open position by a spring 94 and is adapted to be closed upon energization of a relay 95 connected to the stem of the valve.

The pilot aspirator 90 is adapted to remain in operation though the heat content of the gas in main 11 should rise above the desired maximum value of 1,005 B. t. u. per cubic foot and will continue to operate as the pressure in the main 11 decreases until eventually the gas mixture fed thereby has a heat content below 1,000 B. t. u. per cubic foot. As this gas mixture is drawn off to the burner 46, the temperature of flame 43 will decrease, causing the pyrometer element 49 to move counterclockwise into reengagement with the contact 60 whereupon the timer switch 39 will be actuated to control the main feed aspirators in the usual manner.

Means are provided to close the control valve 91 in the event that the main 11 should become plugged and the pressure therein and the heat value of the gas should rise to a predetermined limit. There is provided on the pyrometer a further contact 96 which will be engaged by the element 49 in the event the heat value of the gas in main 11 should rise above the normal maximum operating heat value, for example, to 1,010 B. t. u. per cubic foot. Engagement of the element 49 with the contact point 96 closes a circuit through a constant speed motor 97 of a second time switch indicated generally at 98. This circuit can be traced from the supply line 59 through the conductor 58, the element 49, the contact point 96, the conductor 99, the motor 97, and the conductor 100, to the supply line 61. The motor 97 operates at a desired speed, for example, one revolution per minute and is operatively connected to operate the normally open switch 102 which may be cam operated, as shown. As the motor 97 begins to rotate, the switch 102 will be closed, closing a circuit through the winding of the relay 95 and causing the valve 91 to close and shut off the supply of gas to the aspirator 90. This circuit can be traced from the supply line 61, through the conductor 104, the switch 102, the winding of a holding relay 105, a conductor 106, the winding of the relay 95, and the conductor 107, to the supply line 59. Preferably, for reasons to become apparent, the switch 102 is arranged to close during one-half a revolution of the motor 97; that is, for thirty seconds, and to open during the other half-revolution. Upon energization of the relay 105, the normally open contacts 108 thereof will close, short-circuiting the connection between the motor 97 and the supply line 59 across the pyrometer contact point 96 and the pyrometer element 49 so that the motor 97 will continue in operation through a full half-revolution thereof even though the element 49 should disengage from the contact point 96. It will be seen that every half minute the circuit through the relay 95 will be broken, permitting the valve 91 to open, and effecting operation of the aspirator 90 to discharge a gas mixture into the main 11. This particular feature last described is important in the operation of the present system.

As mentioned above, withdrawal of the gas from the main with all of the aspirators out of operation can be continued without affecting the heat value of the gas mixture within the main until all of the gas is removed. However, if, when the pilot aspirator 90 begins to discharge into the main 11, the pressure within the main has dropped from its previous maximum level, the aspirator 90 will feed a gas mixture into the main that is of a lower heat value than that in the main, which mixture will flow rapidly to the burner 46 to cause a decrease in the temperature of the flame 43. As the flame temperature drops, the pyrometer indicator element 49 will move counterclockwise and out of engagement of the contact 95 whereby the motor 97 will stop its rotation and the valve 91 will remain open. The delay in reclosing switch 102 previously referred to is for the purpose of providing time for the gas mixture to flow from the pilot aspirator 90 to the burner 46. As the gas pressure in the main continues to drop as a result of the normal consumption, the richness of the gas mixture from the aspirator 90 will continue to decrease correspondingly and the temperature of the flame 43 in turn will decrease until eventually the pyrometer indicator element 49 makes contact with the minimum contact point 60, whereupon the main feed aspirators will be put into operation as necessary to maintain the desired gas mixture within the main 11.

A valuable feature of the control arrangement of the present invention is that the entire system is self-compensating for changes in the B. t. u. content of the raw fuel and to changes in the atmospheric pressure or the humidity of the air. In some of the smaller gas systems which utilize butane and propane mixtures as the fuel, the self-compensating feature is of great value inasmuch as the ratios of the raw gases supplied, and consequently the heat value thereof, varies considerably from season to season and even from one tank thereof to another. In winter, for example, the gas is shipped with a relatively high propane content so as to maintain pressure on the fuel within the tank since butane liquefies at a relatively high temperature. In the summer, on the other hand, the gas is shipped with a relatively low propane content and the heat value of the gas is considerably higher. In a control system which does not rely directly on the heat value of the gas within the main to regulate the feeding of gas thereto, continual adjustment of various elements of the system is necessary to maintain the desired heat value. In the present system, on the other hand, the adjustment is taken care of automatically by the control arrangement.

With the control arrangement of the present invention it is also possible to maintain the heat value of the gas mixture within the main within a fraction of one per cent of the desired value. Such accuracy has not heretofore been possible in commercial installations.

Having illustrated and described a preferred embodiment of the invention, it should be apparent to those skilled in the art that the invention permits of modification in arrangement and detail. All such modifications as come within the true spirit and scope of the appended claims are considered to be a part of my invention.

I claim:

1. Electrical control apparatus for a gas system including a source of gaseous fuel under pressure, a main, a plurality of gas mixing devices connected to discharge into said main, conduit means connecting said source to said devices, and a plurality of valve means in said conduit means for selectively controlling the flow of gas from said source to certain of said gas mixing means, said apparatus comprising a calorimetric device adapted to be operatively connected to said main for continuously determining and indicating the heat value of the gas mixture within said main, time switch means operatively connected to said calorimetric device and responsive to indications therefrom, and valve control means controlled by said time switch means for opening or closing certain of said valve means at predetermined intervals of time in response to certain predetermined indications from said calorimetric device.

2. In a gas system including a main, a plurality of aspirator housings connected to said main, each of said housings having an air inlet, a suction producing nozzle mounted in each of said aspirator housings, a source of gas under pressure, conduit means connecting said source to said nozzles, a plurality of valves in said conduit means for selectively controlling the flow of gas to said nozzles, means connected to said main for continuously removing and burning a portion of the gas mixture in said main, a pyrometric device including means for indicating changes in the temperature of the flame of said burning portion, time switch means operatively connected to said temperature indicating means and adapted to be energized in response to indications of predetermined minimum and maximum temperatures, and means responsive to said time switch means for successively opening certain of said valves at predetermined intervals upon indication of a predetermined minimum flame temperature, and for successively closing certain of said valves at predetermined intervals upon indication of a predetermined maximum flame temperature.

3. In a gas system of the class described, the combination comprising a plurality of aspirator housings each having an air inlet therein, a nozzle in each of said housings, a gas main into which said housings discharge, a source of gas under super-atmospheric pressure, conduit means connecting said source to said nozzles, a plurality of valve means in said conduit means for controlling the flow of gas to said nozzles, calorimetric means responsive to changes in the heat value of the gas mixture in said main for deriving indications corresponding to predetermined minimum and maximum heat values of said gas mixture, and means operatively connected to said calorimetric means and responsive to a continued maximum indication for successively closing certain ones of said valve means at predetermined intervals of time, and responsive to a continued minimum indication for successively opening certain ones of said valve means at predetermined intervals of time.

4. In a gas mixing apparatus of the class described, the combination comprising a plurality of aspirator housings each having an air inlet therein, a nozzle in each of said housings, a gas main into which said housings discharge, a source of gas under super-atmospheric pressure, conduit means connecting said source to said nozzles, a plurality of valve means in said conduit means for controlling the flow of gas to said nozzles, calorimetric means responsive to changes in the heat value of the gas mixture in said main for deriving indications corresponding to a predetermined maximum heat value of said gas mixture, and valve control means operatively connected to said calorimetric means and responsive to a continued maximum indication for successively closing certain ones of said valve means at predetermined intervals of time.

5. In a gas mixing apparatus of the class described, the combination comprising a plurality of aspirators each including a housing, each housing having an air inlet therein, a nozzle in each of said housings, a gas main into which said aspirators discharge, a source of gas under super-atmospheric pressure, conduit means connecting said source to said nozzles, calorimetric means responsive to changes in the heat value of the gas mixture in said main for deriving indications corresponding to a predetermined minimum heat value of said gas mixture, and control means operatively connected to said calorimetric means and responsive to a continued minimum indication for successively initiating, at predetermined intervals of time, discharge into said main from certain of said aspirators.

6. In a gas system, a gas main, a source of raw fuel gas, a plurality of gas mixing means operatively connected to said main and said source and adapted to mix said fuel gas with a diluent gas and to discharge to said main a mixture of said fuel and diluent gases relatively proportional in fuel gas content to the pressure in said main, calorimetric means operatively connected to said main for continuously determining and indicating the heat value of the gas mixture in said main, time switch means connected to said calorimetric means responsive to maximum and minimum indications therefrom, and control means for said gas mixing means operated by said time switch means for stopping or starting operation of certain of said gas mixing means at predetermined intervals of time in response to continued indications of maximum or minimum heat values.

7. In a gas mixing apparatus of the character described, a gas main, a source of raw fuel gas, a source of diluent gas, normally operating pilot means operatively connected to said main and said source for feeding to said main a mixture of said fuel and diluent gases relatively proportional in fuel gas content to the pressure in said main, sampling means for continuously removing and burning a portion of the gas mixture in said main, pyrometric means for determining the temperature of the flame of the burning sample gases and for indicating the same, control means operatively connected to said pyrometric means responsive to an indication of a predetermined maximum temperature for interrupting the operation of said pilot means, said control means including time switch means for periodically reinstituting operation of the pilot means to feed a gas mixture into said main, whereby upon a decrease in the pressure in said main said pilot means will feed a gas mixture of lower heat value therein and by consequence of the resulting decrease in the flame temperature of the burning sample gases said control means will be rendered ineffective to prevent operation of said pilot means.

8. In a gas mixing apparatus of the character described, a gas main, a source of raw fuel gas, a source of diluent gas, pilot means operatively connected to said main and said sources for feeding to said main a mixture of said fuel and diluent gases relatively proportional in fuel gas content to the pressure in said main, calorimetric means including a movable indicator for continuously determining the heat value of the gas mixture in said main, control means operatively connected to said indicator responsive to an indication of a predetermined limit for interrupting the operation of said pilot means, said control means including time switch means for periodically reinstituting operation of the pilot means to feed a gas mixture into said main, whereby upon a decrease in the pressure in said main said pilot means will feed a gas mixture of lower heat value therein and said control means will be rendered ineffective to prevent subsequent operation of said pilot means.

9. In a control arrangement of the class described for controlling the heat value of a gas mixture within a main, a source of raw fuel gas under super-atmospheric pressure, a pilot aspirator tube having an air inlet therein, said tube being connected to discharge into said main, a suction nozzle in said tube, conduit means connecting said source to said nozzle, a normally open valve in said conduit means, calorimetric means for continuously determining and indicating the heat value of the gas mixture in said main, and valve control means operatively connected to said calorimetric means responsive to an indication of a predetermined limit for closing said valve for a predetermined period of time.

10. In a gas mixing apparatus of the character described, a pilot aspirator housing having a suction-producing nozzle therein, an air inlet in said housing, a gas main connected to receive the discharge from said aspirator, a source of gas under pressure, conduit means connecting said source to said nozzle, a normally open valve in said conduit means for controlling the flow of gas therethrough, calorimetric means for indicating changes in the heat value of the gas mixture in said main, and valve control means operatively connected to said calorimetric means and responsive to an indication of a predetermined limit to close said valve and to permit opening of said valve upon termination of said maximum indication.

References Cited in the file of this patent

UNITED STATES PATENTS

| | | |
|---|---|---|
| 1,591,324 | Keith | July 6, 1926 |
| 1,682,684 | Pinkerton | Aug. 28, 1928 |
| 2,072,384 | Schmidt | Mar. 2, 1937 |
| 2,073,072 | Pontow et al. | Mar. 9, 1937 |
| 2,286,538 | Guler | June 16, 1942 |
| 2,342,426 | Ransome | Feb. 22, 1944 |
| 2,637,638 | Schmidt | May 5, 1953 |
| 2,678,877 | Ransome | May 18, 1954 |